United States Patent
Shindo

(10) Patent No.: US 10,026,955 B2
(45) Date of Patent: Jul. 17, 2018

(54) METHOD FOR PRODUCING POSITIVE ELECTRODE ACTIVE MATERIAL LAYER FOR LITHIUM ION BATTERY, AND POSITIVE ELECTRODE ACTIVE MATERIAL LAYER FOR LITHIUM ION BATTERY

(71) Applicant: TOYOTA JIDOSHA KABUSHIKI KAISHA, Toyoya-shi, Aichi-ken (JP)

(72) Inventor: Yohei Shindo, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 173 days.

(21) Appl. No.: 14/828,135

(22) Filed: Aug. 17, 2015

(65) Prior Publication Data
US 2016/0064729 A1    Mar. 3, 2016

(30) Foreign Application Priority Data
Aug. 29, 2014    (JP) .................................. 2014-176599

(51) Int. Cl.
*H01M 4/36*    (2006.01)
*H01M 4/04*    (2006.01)
(Continued)

(52) U.S. Cl.
CPC .......... *H01M 4/364* (2013.01); *C01G 53/52* (2013.01); *H01M 4/0404* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 2009/0087731 | A1* | 4/2009 | Fukui | H01M 4/131 429/164 |
| 2009/0123851 | A1* | 5/2009 | Soma | H01M 4/131 429/342 |

(Continued)

FOREIGN PATENT DOCUMENTS

| | | |
|---|---|---|
| CN | 102136599 A | 7/2011 |
| CN | 103380530 A | 10/2013 |
| JP | 2011-150873 A | 8/2011 |
| JP | 2014-103098 A | 6/2014 |

*Primary Examiner* — Imran Akram
(74) *Attorney, Agent, or Firm* — Oliff PLC

(57) ABSTRACT

To provide a method for producing a positive electrode active material layer for lithium ion battery that can improve durability and internal resistance of lithium ion battery, and particularly lithium ion battery that operates at high voltage. The method for producing positive electrode active material layer for a lithium ion battery includes coating a substrate with positive electrode mixture slurry containing positive electrode active material, first lithium salt, second lithium salt and solvent, and drying off the solvent. First lithium salt is lithium phosphate, the second lithium salt is selected from the group including of lithium carbonate, lithium hydroxide, lithium nitrate, lithium acetate, lithium sulfate and combinations thereof, and the proportion of the second lithium salt with respect to the first lithium salt is 1 to 50 mol % based on the number of lithium atoms.

7 Claims, 2 Drawing Sheets

(51) Int. Cl.
*H01M 4/505* (2010.01)
*H01M 4/525* (2010.01)
*H01M 10/0525* (2010.01)
*C01G 53/00* (2006.01)
*H01M 4/131* (2010.01)
*H01M 4/1391* (2010.01)
*H01M 4/62* (2006.01)
*H01M 4/02* (2006.01)

(52) U.S. Cl.
CPC ......... *H01M 4/131* (2013.01); *H01M 4/1391* (2013.01); *H01M 4/505* (2013.01); *H01M 4/525* (2013.01); *H01M 4/62* (2013.01); *H01M 10/0525* (2013.01); *C01P 2006/40* (2013.01); *H01M 4/0471* (2013.01); *H01M 2004/028* (2013.01); *H01M 2220/20* (2013.01); *H01M 2220/30* (2013.01); *Y02E 60/122* (2013.01)

(56) References Cited

U.S. PATENT DOCUMENTS

| | | | |
|---|---|---|---|
| 2010/0028768 A1* | 2/2010 | Morita | H01M 2/1653 429/144 |
| 2010/0261063 A1* | 10/2010 | Kitagawa | C01B 25/37 429/232 |
| 2011/0052971 A1* | 3/2011 | Fujikawa | H01M 2/22 429/161 |
| 2011/0177364 A1 | 7/2011 | Miyazaki et al. | |
| 2012/0313570 A1* | 12/2012 | Ohtaniuchi | H01M 10/0525 320/103 |
| 2013/0330609 A1* | 12/2013 | Sawa | H01M 4/587 429/200 |
| 2014/0127563 A1* | 5/2014 | Kim | H01M 4/13 429/211 |
| 2015/0180036 A1 | 6/2015 | Takebayashi | |

* cited by examiner

METHOD FOR PRODUCING POSITIVE ELECTRODE ACTIVE MATERIAL LAYER FOR LITHIUM ION BATTERY, AND POSITIVE ELECTRODE ACTIVE MATERIAL LAYER FOR LITHIUM ION BATTERY

TECHNICAL FIELD

The present invention relates to a method for producing a positive electrode active material layer for a lithium ion battery, and to a positive electrode active material layer for a lithium ion battery produced by the method.

BACKGROUND ART

Lithium ion secondary batteries are known as secondary batteries that have high charge-discharge capacity and that are capable of high output. Currently, lithium ion secondary batteries are used primarily as power sources for portable electronic devices, and are also promising as power sources for electric vehicles that are anticipated to become more prevalent in the future.

Lithium ion secondary batteries have, at the positive electrode and negative electrode, respective active materials capable of intercalating and desorbing lithium (Li), and they operate by migration of lithium ion in the electrolyte solution between the two electrodes. In a lithium ion secondary battery, the positive electrode active material used is mainly a lithium-containing metal complex oxide such as lithium cobalt complex oxide, while the negative electrode active material used is mainly a carbon material with a multilayer structure.

However, the capacities of existing lithium ion secondary batteries cannot be considered satisfactory, and higher capacities are desired.

In this regard, it has been proposed in recent years to raise the maximum operating potential of the positive electrode, thereby increasing the open-circuit voltage between the battery terminals. Specifically, the post-charging open-circuit voltage between battery terminals in a common lithium secondary battery of the prior art, has been 4.2 V or below upon completion of charging, and it has therefore been proposed to further increase the voltage in order to achieve even higher capacity for the lithium secondary battery. Yet increasing the voltage exacerbates the problem of oxidative decomposition of the electrolyte solution near the positive electrode during charging.

In response to this problem, Patent Document 1 teaches that, during formation of a positive electrode active material layer for a lithium ion battery that operates at high voltage, it is possible to improve the durability of the obtained lithium ion battery by using an inorganic phosphate such as lithium phosphate in addition to the positive electrode active material.

CITATION LIST

Patent Literature

[Patent Document 1] Japanese Unexamined Patent Publication No. 2014-103098

SUMMARY OF THE INVENTION

Problems to be Solved by the Invention

The positive electrode active material layer of Patent Document 1 minimizes problems with the durability of lithium ion batteries, and particularly lithium ion batteries that operate at high voltage. For industrial use, however, there is demand for a lithium ion battery having not only higher durability but also yet higher performance.

Means for Solving the Problems

As a result of diligent research, the present inventors have devised the following invention.

(1) A method for producing a positive electrode active material layer for a lithium ion battery, wherein the method comprises coating a substrate with a positive electrode mixture slurry containing a positive electrode active material, a first lithium salt, a second lithium salt and a solvent, and drying off the solvent, wherein the first lithium salt is lithium phosphate, wherein the second lithium salt is selected from the group consisting of lithium carbonate, lithium hydroxide, lithium nitrate, lithium acetate, lithium sulfate and combinations thereof, and wherein the proportion of the second lithium salt with respect to the first lithium salt is 1 to 50 mol % based on the number of lithium atoms.

(2) The method according to (1) above, wherein the second lithium salt is selected from the group consisting of lithium carbonate, lithium hydroxide and combinations thereof.

(3) The method according to (1) or (2) above, wherein the positive electrode mixture slurry contains the first lithium salt at a proportion of 0.5 to 10.0 wt % with respect to the positive electrode active material.

(4) The method according to any one of (1) to (3) above, wherein the positive electrode active material is a nickel-manganese spinel-based positive electrode active material.

(5) A positive electrode active material layer for a lithium ion battery produced by the method according to any one of (1) to (4) above.

(6) A lithium ion battery having a positive electrode collector, a positive electrode active material layer for a lithium ion battery according to (5) above, a separator, a negative electrode active material layer and a negative electrode collector, stacked in that order, and having a non-aqueous electrolyte solution impregnated into the positive electrode active material layer, the separator and the negative electrode active material layer.

(7) A lithium ion battery according to (6) above, wherein the open voltage has a range of 4.3 V or greater.

Effect of the Invention

According to the method of the invention for producing a positive electrode active material layer for a lithium ion battery, it is possible to not only improve the durability of a lithium ion battery, and particularly a lithium ion battery that operates at high voltage, but also to improve the internal resistance of the lithium ion battery, as a fundamental property.

Figure 1:
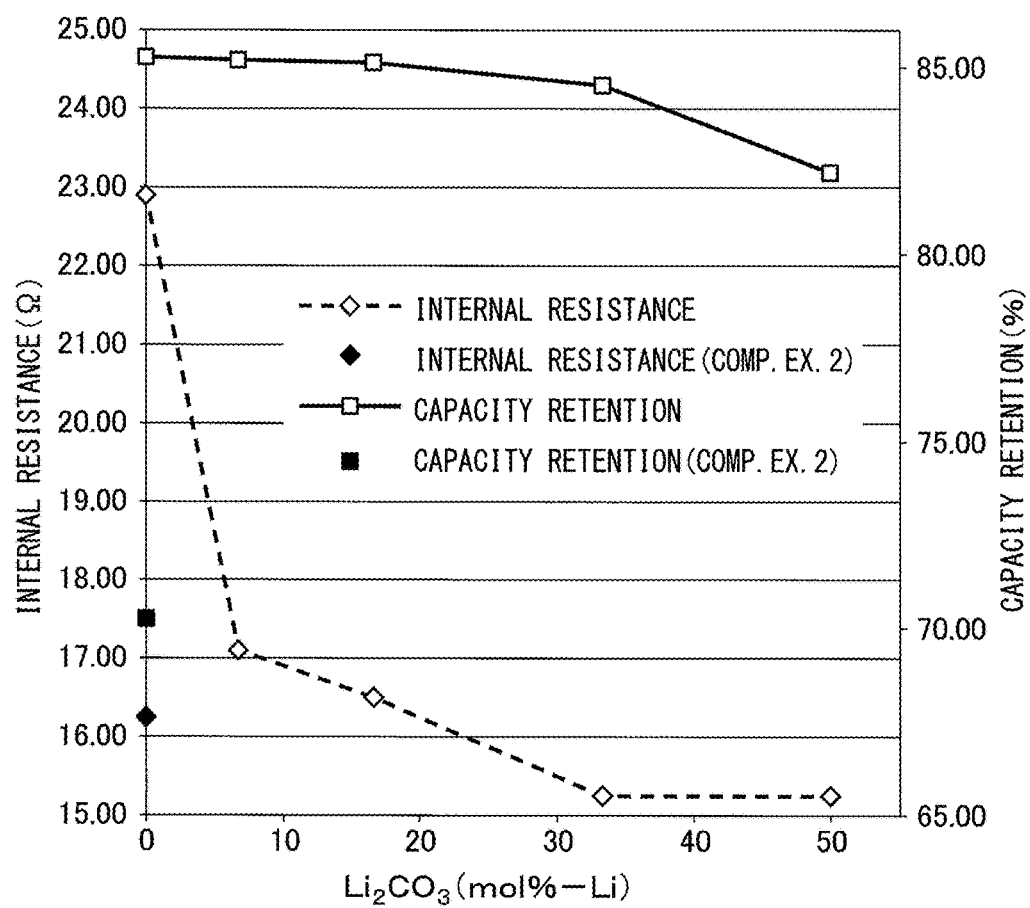
FIG. 1 is a diagram showing the difference in internal resistance and capacity retention of a lithium ion batteries which differ from each other in the proportion of second lithium salt ($Li_2CO_3$) with respect to first lithium salt ($Li_3PO_4$) in the positive electrode mixture slurry (Comparative Example 1 and Examples 1 to 4).

EMBODIMENTS FOR CARRYING OUT THE INVENTION ((Method for Producing Positive Electrode Active Material Layer for Lithium Ion Battery))

The method for producing a positive electrode active material layer for a lithium ion battery according to the invention comprises coating a substrate with a positive electrode mixture slurry containing a positive electrode active material, a first lithium salt, a second lithium salt and a solvent, and drying off the solvent.

The positive electrode mixture slurry to be used in the method of the invention may further contain a conductive material, a binder and other optional additive components. Also, the positive electrode mixture slurry may by obtained by kneading the positive electrode active material, the first lithium salt, the second lithium salt, the solvent and the other optional components.

According to the method of the invention, it is possible to not only improve the durability of a lithium ion battery, and particularly a lithium ion battery that operates at high voltage, but also to improve the fundamental property of internal resistance of the lithium ion battery. Lithium ion batteries that operate at high voltage include, specifically, lithium ion batteries having an open voltage range of 4.3 V ($Li/Li^+$) and greater.

Although not wishing to be bound by any theory, it is thought that the reason that the positive electrode active material layer for a lithium ion battery that is obtained by the method of the invention improves the durability and internal resistance of the lithium ion battery in which it is used, is that the first and second lithium salt forms a thin coating film on the positive electrode active material particles in the positive electrode active material layer, and the coating film inhibits oxidative decomposition of the electrolyte solution on the positive electrode active material particles.

(First Lithium Salt)

In the method of the invention, the first lithium salt is lithium phosphate ($Li_3PO_4$). The first lithium salt may be used in any desired amount in a range that does not prevent the effect of the invention. For example, the first lithium salt may be used in an amount of 0.5 wt % or greater, 1.0 wt % or greater, or 1.5 wt % or greater, with respect to the positive electrode active material. Also, for example, the first lithium salt may be used in an amount of 10.0 wt % or less, 5.0 wt % or less, or 3.0 wt % or less, with respect to the positive electrode active material.

(Second Lithium Salt)

The second lithium salt is selected from the group consisting of lithium carbonate, lithium hydroxide, lithium nitrate, lithium acetate, lithium sulfate, and combinations thereof, and especially lithium carbonate, lithium hydroxide and combinations thereof. The second lithium salt may be used in an amount of 1 mol % or greater, 3 mol % or greater, 5 mol % or greater, or 7 mol % or greater, based on the number of lithium atoms, with respect to the first lithium salt. Also, the second lithium salt may be used in an amount of 50 mol % or less, 40 mol % or less, or 33 mol % or less, based on the number of lithium atoms, with respect to the first lithium salt.

(Positive Electrode Active Material)

The positive electrode active material may be a metal oxide containing lithium and at least one transition metal selected from manganese, cobalt, nickel and titanium, examples of which include lithium cobaltate ($LiCoO_2$), lithium manganate ($LiMn_2O_4$), lithium nickelate ($LiNiO_2$) and combinations thereof, such as lithium nickel-manganate and lithium nickel-cobalt-manganate. An example of lithium nickel-cobalt-manganate is $LiNi_{1/3}CO_{1/3}Mn_{1/3}O_2$.

The method of the invention may be used most suitably for production of a positive electrode active material layer for a lithium ion battery that operates at high voltage, in which case the positive electrode active material used may be a nickel-manganese spinel-based positive electrode active material, such as $LiNi_{0.5}Mn_{1.5}O_{4-w}$ ($0<x<2$, $0 \le w<2$), and particularly $LiNi_{0.5}Mn_{1.5}O_4$. The transition metal sites of the nickel-manganese spinel-based positive electrode active material may also include substituting elements such as titanium (Ti) and iron (Fe).

(Solvent)

The solvent used may be a polar aprotic solvent that does not adversely affect the positive electrode active material in the positive electrode mixture slurry, and especially a polar aprotic organic solvent such as NMP (N-methyl-2-pyrrolidone).

(Substrate)

The substrate on which the positive electrode mixture slurry is to be coated may be a positive electrode collector. When a positive electrode mixture slurry is used on a substrate other than a positive electrode collector, the obtained positive electrode active material layer can be laminated onto the positive electrode collector before or after drying off of the solvent.

The positive electrode collector may be any desired collector, and for example, the collector used may be a metal such as silver, copper, gold, aluminum, nickel, iron, stainless steel, titanium or an alloy of the above, and particularly aluminum or aluminum alloy collectors may be used.

(Conductive Material)

Examples for the optional conductive material include carbon-based conductive materials, and particularly carbon black materials such as acetylene black (AB) or Ketchen Black®, or graphite.

(Binder)

Examples for the optionally used binder include polymer-based binders such as polyvinylidene fluoride (PVDF), styrene-butadiene rubber (SBR), polytetrafluoroethylene (PTFE) and carboxymethyl cellulose (CMC). From the viewpoint of improving the durability of the lithium ion battery, the binder is preferably a non-electrolyte, and most preferably PVDF.

((Positive Electrode Active Material Layer for Lithium Ion Battery))

The positive electrode active material layer for a lithium ion battery of the invention is a positive electrode active material layer produced by the method of the invention for production of a positive electrode active material layer for a lithium ion battery.

With the positive electrode active material layer, it is possible to improve the durability and internal resistance of a lithium ion battery, when it is used in a lithium ion battery, and particularly in a lithium ion battery that operates at high voltage.

((Lithium Ion Battery))

The lithium ion battery of the invention has a positive electrode collector, a positive electrode active material layer for a lithium ion battery of the invention, a separator, a negative electrode active material layer and a negative electrode collector, stacked in that order. In the lithium ion battery, a non-aqueous electrolyte solution is impregnated into the positive electrode active material layer, the separator and the negative electrode active material layer.

The lithium ion battery can exhibit improved durability and internal resistance.

Such a lithium ion battery is, in particular, a lithium ion battery that operates at high voltage, and most particularly it is a lithium ion battery having an open voltage range of 4.3 V (Li/Li$^+$) and greater. The lithium ion battery may have any desired form, and for example, it may be in the form of a cylinder, coin, rectilinear shape, film (laminate) or the like.

Although not wishing to be bound by any theory, as mentioned above, it is thought that in the positive electrode active material layer for a lithium ion battery according to the invention, the first and second lithium salts form a thin coating film on the positive electrode active material particles, thereby minimizing the problem of oxidative decomposition of the electrolyte solution near the positive electrode. Thus, it may be predetermined for the lithium ion battery of the invention to be subjected to a prescribed conditioning treatment after production in order to more reliably form the coating film.

The conditioning treatment may be carried out by repeating charge and discharge of the lithium ion secondary battery a predetermined number of times. The charge rate, discharge rate, charge-discharge set voltage and other parameters during the conditioning treatment may be set as desired in order to obtain suitable durability and internal resistance.

(Positive Electrode Collector and Positive Electrode Active Material Layer)

For the positive electrode collector and positive electrode active material layer, reference may be made to the description of the method of the invention for producing a positive electrode active material layer for a lithium ion battery.

(Separator)

The separator used may be a porous polymer film such as a porous polyethylene film (PE), porous polypropylene film (PP), porous polyolefin film or porous polyvinyl chloride film. A lithium ion or ion conductive polymer electrolyte film may also be used as the separator. Such separators may be used alone or in combinations. From the viewpoint of increasing the battery output, it is preferred to use a three-layer coated separator comprising a porous polyethylene film (PE) sandwiched by upper and lower porous polypropylene films (PP).

(Negative Electrode Active Material Layer)

The negative electrode active material layer contains a negative electrode active material, and the negative electrode active material used may be a material capable of intercalating and deintercalating lithium, such as a powdered carbon material made of graphite, amorphous carbon-covered natural graphite comprising natural graphite covered with amorphous carbon, or the like.

For production of the negative electrode active material layer, reference may be made to the description for the positive electrode active material layer.

For example, the negative electrode active material layer can be obtained by kneading the negative electrode active material, solvent, binder and other components to form a negative electrode mixing slurry, and then coating and drying the negative electrode mixing slurry on the negative electrode collector. When styrene-butadiene rubber (SBR) is used as the binder, water is preferably used as the solvent.

(Negative Electrode Collector)

The negative electrode collector used may be the same material as indicated for the positive electrode collector, and particularly copper, nickel or an alloy thereof may be used.

(Non-Aqueous Electrolyte Solution)

The non-aqueous electrolyte solution may be a composition obtained by adding a supporting electrolyte to a non-aqueous solvent. The non-aqueous solvent may be a material selected from the group consisting of organic electrolytes, fluorine-based solvents, propylene carbonate (PC), ethylene carbonate (EC), diethyl carbonate (DEC), dimethyl carbonate (DMC), ethylmethyl carbonate (EMC), or any combination of two or more of these.

The non-aqueous solvent is preferably a fluorine-based solvent, such as a fluorinated carbonate. As specific fluorinated carbonates there are preferred methyl 2,2,2-trifluoroethyl ether carbonate (MFEC: CAS 156783-95-8), and/or difluorodimethyl carbonate (DFDMC), and most preferably it is a mixture of these in a volume ratio of 50:50.

The supporting electrolyte may be a material selected from the group consisting of lithium compounds (lithium salts) such as LiPF$_6$, LiBF$_4$, LiClO$_4$, LiAsF$_6$, LiCF$_3$SO$_3$, LiC$_4$F$_9$SO$_3$, LiN(CF$_3$SO$_2$)$_2$, LiC(CF$_3$SO$_2$)$_3$ and LiI, as well as combinations of two or more thereof. From the viewpoint of increasing cell voltage and improved durability, LiPF$_6$ is preferred as the supporting electrolyte.

The present invention will now be explained in further detail with reference to examples, with the understanding that the scope of the invention is not limited to the examples or their descriptions.

EXAMPLES

Comparative Example 1

(Fabrication of Positive Electrode)

After mixing a nickel-manganese spinel-based positive electrode active material (LiNi$_{0.5}$Mn$_{1.5}$O$_4$), lithium phosphate (Li$_3$PO$_4$) as a first lithium salt and acetylene black as a conductive material, there were further added N-methyl-pyrrolidone (NMP) as a solvent and polyvinylidene fluoride (PVDF) as a binder dissolved in the solvent, and a positive electrode mixture slurry was prepared.

The proportion of lithium phosphate as the first lithium salt with respect to the positive electrode active material was 1.0 wt %. Also, the blending ratio of the positive electrode active material, the acetylene black as the conductive material and the polyvinylidene fluoride as the binder was 85:10:5 (mass ratio).

The obtained positive electrode mixture slurry was coated onto an aluminum foil (15 µm thickness) as the positive electrode collector by a doctor blading method and dried in air at about 80° C., the N-methylpyrrolidone (NMP) solvent was removed, and vacuum drying was further carried out at 120° C. for 10 hours to form a positive electrode active material layer on the positive electrode collector.

Next, the positive electrode collector and positive electrode active material layer were pressed to contact bond them together, to obtain a positive electrode collector and a positive electrode active material layer having an electrode area of 1.77 cm$^2$ (circular with 1.5 cm diameter).

(Fabrication of Lithium Secondary Battery)

A negative electrode mixing slurry was obtained using graphite as a negative electrode active material, carboxymethyl cellulose (CMC) and styrene-butadiene rubber (SBR) as binders, and water as a solvent, and the obtained negative electrode mixture slurry was applied onto a copper foil as a negative electrode collector, to obtain a negative electrode collector and a negative electrode active material layer.

Also, the positive electrode collector and positive electrode active material layer, the separator, the negative electrode collector and the negative electrode active material layer were stacked, and impregnated with an electrolyte solution, to fabricate a CR2032 bipolar coin cell. The separator was a three-layer coated separator comprising a porous polyethylene film (PE) sandwiched between upper and lower porous polypropylene films (PP). The electrolyte solution comprised lithium hexafluorophosphate ($LiPF_6$) as a supporting electrolyte dissolved at a concentration of 1 mol/$dm^3$ in a mixed solvent of ethylene carbonate (EC) and ethylmethyl carbonate (EMC) (volume ratio of EC and EMC=3:7).

Examples 1 to 4

A CR2032 bipolar coin cell was fabricated in the same manner as Comparative Example 1, except that lithium carbonate ($Li_2CO_3$) was used as the second lithium salt, in proportions of 7 mol % (Example 1), 17 mol % (Example 2), 33 mol % (Example 3) and 50 mol % (Example 4), respectively, with respect to lithium phosphate ($Li_3PO_4$) as the first lithium salt, based on the number of lithium atoms, to prepare the positive electrode mixture slurry.

Examples 5 and 6

A CR2032 bipolar coin cell was fabricated in the same manner as Comparative Example 1, except that lithium hydroxide (LiOH) was used as the second lithium salt, in proportions of 17 mol % (Example 5) and 50 mol % (Example 6), respectively, with respect to lithium phosphate ($Li_3PO_4$) as the first lithium salt, based on the number of lithium atoms, to prepare the positive electrode mixture slurry.

Comparative Example 2

A CR2032 bipolar coin cell was fabricated in the same manner as Comparative Example 1, except that the positive electrode mixture slurry was prepared without using lithium phosphate ($Li_3PO_4$) as the first lithium salt, or in other words, the positive electrode mixture slurry was prepared without using either the first or second lithium salt.

(Evaluation)

A charge-discharge test apparatus (HJ-1001 SMSA by Hokuto Denko Corp.) was used to determine the battery capacity in the range of 3.5 V to 5.5 V with a current value of 0.2 mA·$cm^{-2}$, at a temperature of 25° C. The 1 C rate was calculated from the measured cell capacity, and charge-discharge was conducted 3 times at the 1 C rate, as conditioning.

(Evaluation of Internal Resistance)

After the conditioning, charging was conducted to a SOC (state of charge) of 60%, and then after standing for 30 minutes, discharge was conducted at 25° C. at the 1 C rate, 3 C rate and 5 C rate, and the internal resistance of the battery was evaluated from the overvoltage after 10 seconds. The results are shown in Table 1 and in FIGS. 1 and 2.

(Evaluation of Capacity Retention)

After the conditioning, constant current charge to 4.9 V was conducted at 60° C., followed by discharge to 3.5 V at the 2 C rate, and the discharge capacity at that time was recorded as the initial battery capacity. Next, a cycle of charging to 4.9 V followed by discharging to 3.5 V at the 2 C discharge rate, was repeated for a total of 200 cycles, the discharge capacity at the 200th cycle was recorded as the battery capacity after endurance, and the capacity retention of the battery was calculated. The results are shown in Table 1 and in FIGS. 1 and 2. The capacity retention (%) of the battery was calculated by the following formula.

Capacity retention (%)=(Battery capacity after endurance/Initial battery capacity)×100

TABLE 1

| | First lithium salt | | Second lithium salt | | | |
|---|---|---|---|---|---|---|
| | Type | Addition amount with respect to positive electrode active material (mass %) | Type | Addition amount with respect to first lithium salt (mol %-Li) | Resistance (Ω) | Capacity retention (%) |
| Comp. Ex. 1 | $Li_3PO_4$ | 1.0 | None | 0 | 22.90 | 85.28 |
| Example 1 | $Li_3PO_4$ | 1.0 | $Li_2CO_3$ | 7 | 17.10 | 85.20 |
| Example 2 | $Li_3PO_4$ | 1.0 | $Li_2CO_3$ | 17 | 16.50 | 85.13 |
| Example 3 | $Li_3PO_4$ | 1.0 | $Li_2CO_3$ | 33 | 15.25 | 84.53 |
| Example 4 | $Li_3PO_4$ | 1.0 | $Li_2CO_3$ | 50 | 15.25 | 82.20 |
| Comp. Ex. 1 | $Li_3PO_4$ | 1.0 | None | 0 | 22.90 | 85.28 |
| Example 5 | $Li_3PO_4$ | 1.0 | LiOH | 17 | 16.90 | 84.40 |
| Example 6 | $Li_3PO_4$ | 1.0 | LiOH | 50 | 16.50 | 82.70 |
| Comp. Ex. 2 | — | 0 | — | 0 | 16.25 | 70.25 |

As shown in Table 1, in Examples 1 to 6 where the positive electrode mixture slurry contained a second lithium salt ($Li_2CO_3$ or LiOH) in addition to the first lithium salt ($Li_3PO_4$), the capacity retention of the lithium ion battery was improved and the internal resistance of the battery was low, in comparison with Comparative Example 2 where the positive electrode mixture slurry did not contain a first and second lithium salts.

Figure 2:
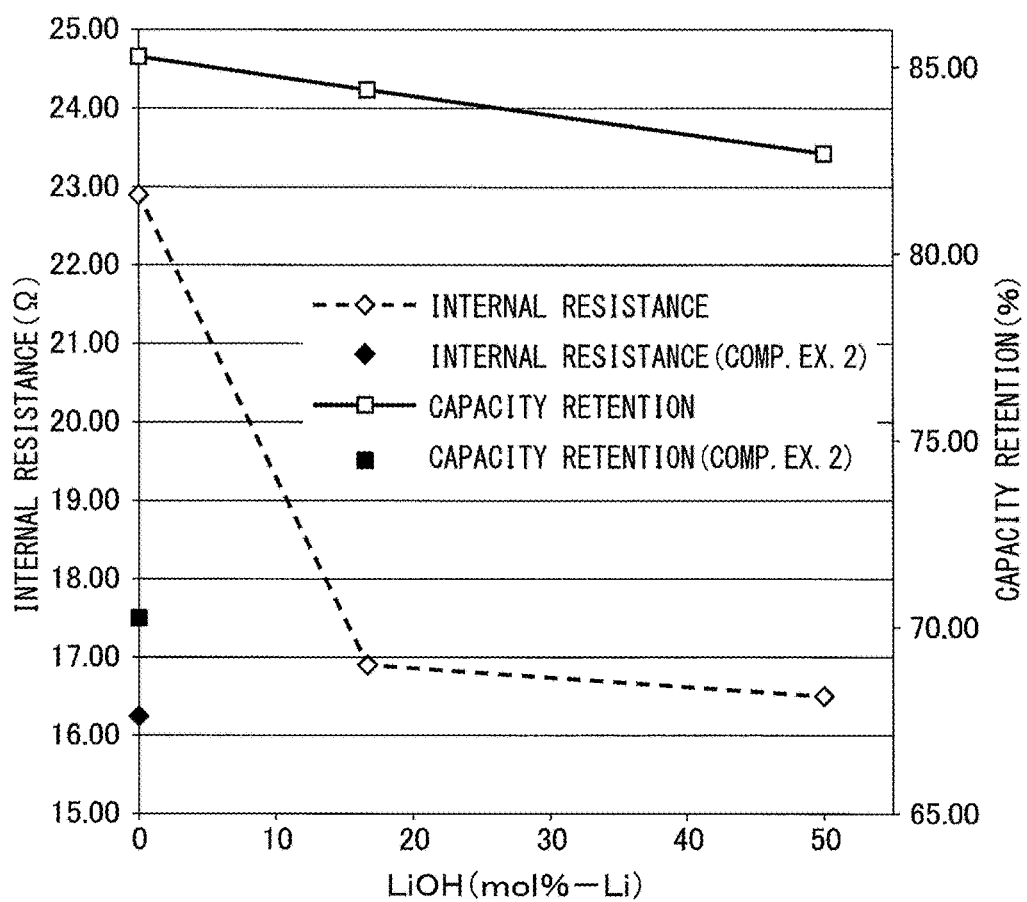
FIG. 2 is a diagram showing the differences in internal resistance and capacity retention of a lithium ion batteries which differ from each other in the proportion of second lithium salt (LiOH) with respect to first lithium salt ($Li_3PO_4$) in the positive electrode mixture slurry (Comparative Example 1 and Examples 5 and 6).

As also shown in Table 1 and in FIG. 1 and FIG. 2, in Examples 1 to 6 where the positive electrode mixture slurry contained a second lithium salt ($Li_2CO_3$ or LiOH) in addition to the first lithium salt ($Li_3PO_4$), the capacity retention of the lithium ion battery was maintained at a comparable level while the internal resistance of the battery was low, in comparison with Comparative Example 1 where the positive electrode mixture slurry contained a first lithium salt but did not contain a second lithium salt.

Incidentally, while lithium carbonate or lithium hydroxide was used as the second lithium salt in the examples, lithium nitrate, lithium acetate or lithium sulfate, having approximately similar ease of decomposition, may also be used in the same manner. Furthermore, the amount of second lithium salt added with respect to the first lithium salt was varied within the range of 7 to 50 mol %-Li in the examples, but it may be understood from FIG. 1 and FIG. 2 that the effect of the invention is obtained when a second lithium salt is present, and particularly that the effect is not negligible if the amount of second lithium salt is 1 mol %-Li or greater.

What is claimed is:

1. A method for producing a positive electrode active material layer for a lithium ion battery, wherein the method comprises:
    coating a substrate with a positive electrode mixture slurry containing a positive electrode active material, a first lithium salt, a second lithium salt and a solvent, and drying off the solvent,
    wherein the first lithium salt is lithium phosphate,
    wherein the second lithium salt is lithium hydroxide,
    wherein the proportion of the second lithium salt with respect to the first lithium salt is 1 to 50 mol % based on the number of lithium atoms, and
    wherein the positive electrode mixture slurry contains the first lithium salt in an amount of 0.5 to 10.0 wt % with respect to the positive electrode active material.

2. The method according to claim 1, wherein the proportion of the second lithium salt with respect to the first lithium salt is 17 to 50 mol % based on the number of lithium atoms.

3. The method according to claim 1, wherein the positive electrode active material is a nickel-manganese spinel-based positive electrode active material.

4. A positive electrode active material layer for a lithium ion battery produced by the method according to claim 3.

5. A positive electrode active material layer for a lithium ion battery produced by the method according to claim 1.

6. A lithium ion battery having a positive electrode collector, a positive electrode active material layer for a lithium ion battery according to claim 5, a separator, a negative electrode active material layer and a negative electrode collector, stacked in that order, and having a non-aqueous electrolyte solution impregnated into the positive electrode active material layer, the separator and the negative electrode active material layer.

7. A lithium ion battery according to claim 6, wherein the open voltage has a range of 4.3 V or greater.

* * * * *